(12) United States Patent
Palang

(10) Patent No.: US 7,300,286 B2
(45) Date of Patent: Nov. 27, 2007

(54) EDUCATIONAL TOOL

(76) Inventor: Ronald P. Palang, 5660 Jackie La., Beaumont, TX (US) 77713

( * ) Notice: Subject to any disclaimer, the term of this patent is extended or adjusted under 35 U.S.C. 154(b) by 309 days.

(21) Appl. No.: 11/172,948

(22) Filed: Jul. 5, 2005

(65) Prior Publication Data

US 2007/0020593 A1    Jan. 25, 2007

(51) Int. Cl.
*G06C 1/00* (2006.01)
(52) U.S. Cl. .................................................. 434/203
(58) Field of Classification Search ................ 434/188, 434/191, 202, 203, 204, 205
See application file for complete search history.

(56) References Cited

U.S. PATENT DOCUMENTS

| | | | |
|---|---|---|---|
| 452,302 A | 5/1891 | Denison | |
| 465,811 A | 12/1891 | Anderson | |
| 1,532,011 A * | 3/1925 | Williamson | 434/203 |
| 2,646,631 A * | 7/1953 | Lazar | 434/203 |
| 3,273,262 A * | 9/1966 | Smith, Jr. | 434/203 |
| 3,387,392 A * | 6/1968 | Kurz | 434/203 |
| 3,455,034 A * | 7/1969 | Schott | 434/203 |
| 3,710,456 A | 1/1973 | Jerman | |
| 4,812,124 A | 3/1989 | Colodner et al. | |
| 5,149,269 A * | 9/1992 | Ylitalo | 434/203 |
| 5,205,747 A * | 4/1993 | Tan | 434/203 |
| 5,334,026 A | 8/1994 | Ylitalo | |
| 5,725,380 A * | 3/1998 | Kennelly | 434/203 |
| 5,769,639 A * | 6/1998 | Foster | 434/159 |
| 6,375,468 B1 | 4/2002 | Sundararajan | |
| 7,077,655 B2 * | 7/2006 | Watanabe | 434/203 |

* cited by examiner

*Primary Examiner*—Kurt Fernstrom
(74) *Attorney, Agent, or Firm*—Stephen R. Greiner

(57) ABSTRACT

An educational tool including a frame having a rod extending between its opposite sides. A number of beads are slidably positioned on the rod. A reckoning bar is slidably secured to the top of the frame. The reckoning bar bears indicia, for counting the beads, in the form of a series of whole numbers that increase from one side of the frame to the other. Another reckoning bar is slidably secured to the bottom of the frame and bears indicia, for counting the beads, in the form of a series of whole numbers that increase in a direction opposite that provided to the indicia on the first reckoning bar. A slide is slidably secured to the top of the frame for selectively covering the indicia on the first reckoning bar. A second slide is slidably secured to the bottom of the frame for selectively covering the indicia on the second reckoning bar.

6 Claims, 4 Drawing Sheets

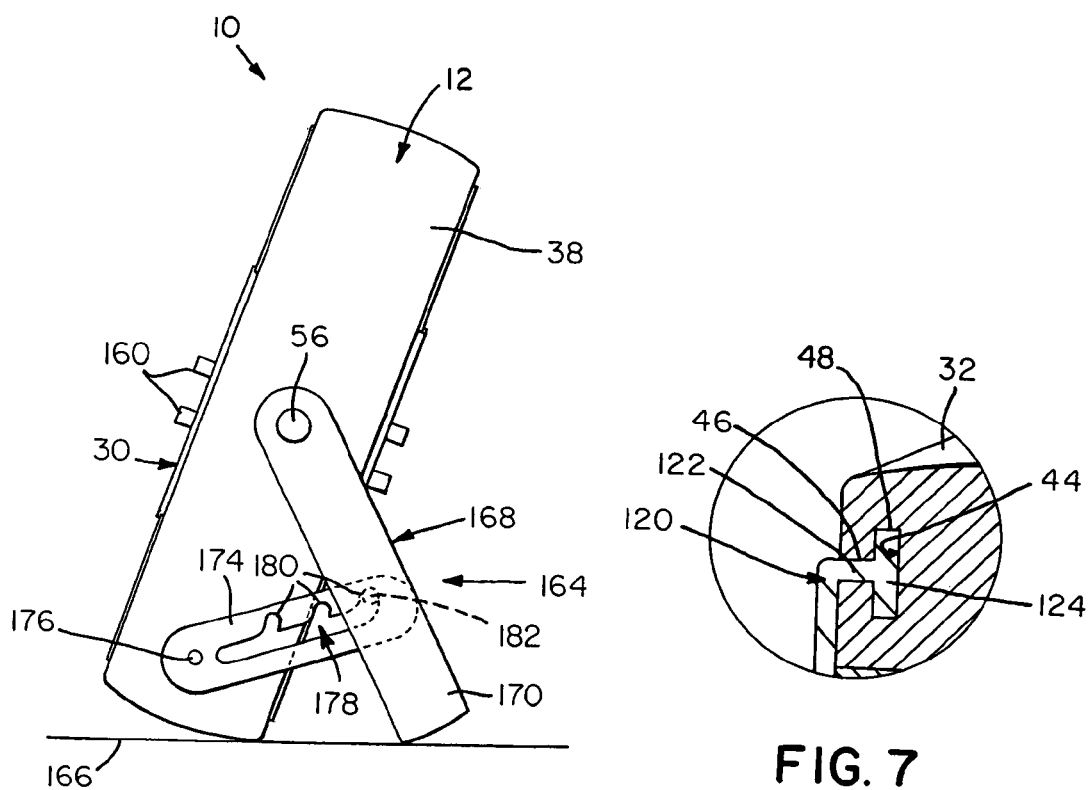
FIG. 6
FIG. 7
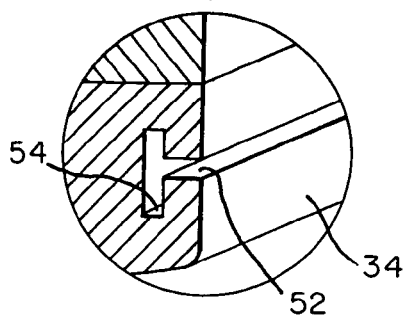
FIG. 8
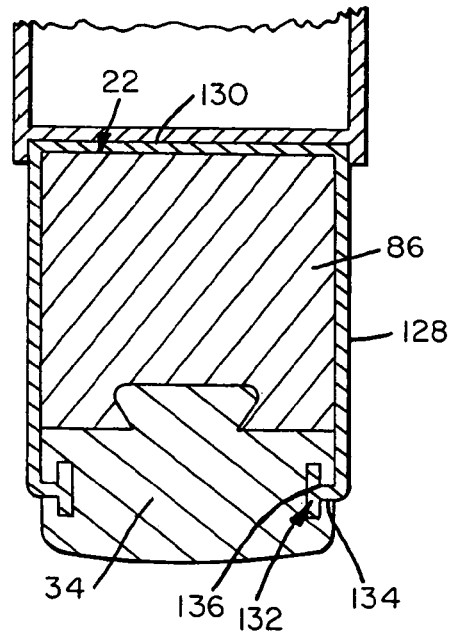
FIG. 9

EDUCATIONAL TOOL

FIELD OF THE INVENTION

The present invention relates generally to educational and demonstrational apparatus and, more particularly, to such apparatus having apertured elements on elongate means.

BACKGROUND OF THE INVENTION

Small groups of objects are often used as visual aids in teaching basic mathematical skills. For example, five apples can be employed to teach a child to count to five. Alternatively, the same five apples can be separated into two or more groups that can be recombined in various ways to practice addition. Of course, subtraction can be practiced by removing any number of the original group of five apples and, then, counting the remainder.

Teaching aids have been developed that secure a group of like objects together in a manner that prevents them from becoming lost or moving about in a confusing way during their use. Generally speaking, these teaching aids place a number of slidable beads on one or more rods. Adjacent the rods is often positioned a sequence of numbers that helps in counting the beads and in working out mathematical problems posed by a teacher.

Mathematics skills, for better or worse, are developed in individualized ways. Some students prefer to count objects arranged horizontally, as would be found in a typical teaching aid, from right to left while others like to count from left to right. Also, some students can handle large sets of objects from the start whereas others need to work their way up from small sets. No counting method has a particular advantage over the other. However, an ingrained, counting preference can make the use of some teaching aids impractical and detrimental for some students. Unfortunately, it is difficult to discern which students will have a tough time with a particular teaching aid prior to its use.

SUMMARY OF THE INVENTION

In light of the problems associated with the known apparatus for teaching basic mathematical skills, it is a principal object of the invention to provide an educational tool that permits a student to solve basic mathematics problems in a personalized manner by permitting him to count from either left-to-right or from right-to-left. Provided that the tool is properly used, either approach will quickly provide the same, correct answer to a given mathematics problem.

It is a further object of the invention to provide an educational tool of the type described that permits a student to learn to count sets of objects as well as add and subtract objects within a particular set. The size of the set of objects being worked with by a particular student can be selectively varied so that more advanced students can work with larger sets than their slower counterparts and can remain challenged.

It is an additional object of the present invention to provide an educational tool of the type described wherein the answer to a particular problem being worked on by a student is hidden from view until a solution is proposed by a student so that a student cannot "cheat" in solving the problem.

Still another object of the present invention is to provide an educational tool of the type described that teaches pattern recognition skills along with mathematical skills.

It is another object of the invention to provide an educational tool of the type described that is self-contained and requires neither additional equipment nor prolonged training to operate effectively. The tool can be operated by a student alone or a student in cooperation with a teacher.

It is an object of the invention to provide improved elements and arrangements thereof in an educational tool for the purposes described that is uncomplicated in construction, inexpensive to manufacture, and fully dependable in use.

Briefly, the educational tool in accordance with this invention achieves the intended objects by featuring a frame having a first side and a second side. A rod extends between the first side and the second side of the frame and a number of beads are slidably positioned on the rod. A reckoning bar is slidably secured to the top of the frame and bears indicia, for counting the beads, in the form of a series of whole numbers increasing in a direction from the first side to the second side of the frame. Another reckoning bar is slidably secured to the bottom of the frame and bears indicia, for counting the beads, in the form of a series of whole numbers increasing in a direction from the second side to the first side of the frame. A slide is slidably secured to the top of the frame for selectively covering the indicia on the first reckoning bar. Another slide is slidably secured to the bottom of the frame for selectively covering the indicia on the second reckoning bar. One of a pair of dividers is respectively secured to each of said reckoning bars for separating the beads into groups. Each of the dividers has at least one opening through which the beads can be selectively slid upon the rod and a spring-biased piston for selectively closing the opening.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 6 is a side view of the educational tool with its stand being extended for holding the tool upright upon a horizontal supporting surface.

FIG. 7 is an enlarged portion of FIG. 6 showing details of a slide attachment tab.

FIG. 8 is another enlarged portion of FIG. 6 showing details of a slot within which a slide tab runs.

FIG. 9 is an enlarged cross-sectional view of the bottom member of the educational tool showing details thereof.

Similar reference characters denote corresponding features consistently throughout the accompanying drawings.

DETAILED DESCRIPTION OF THE PREFERRED EMBODIMENT

Figure 1:
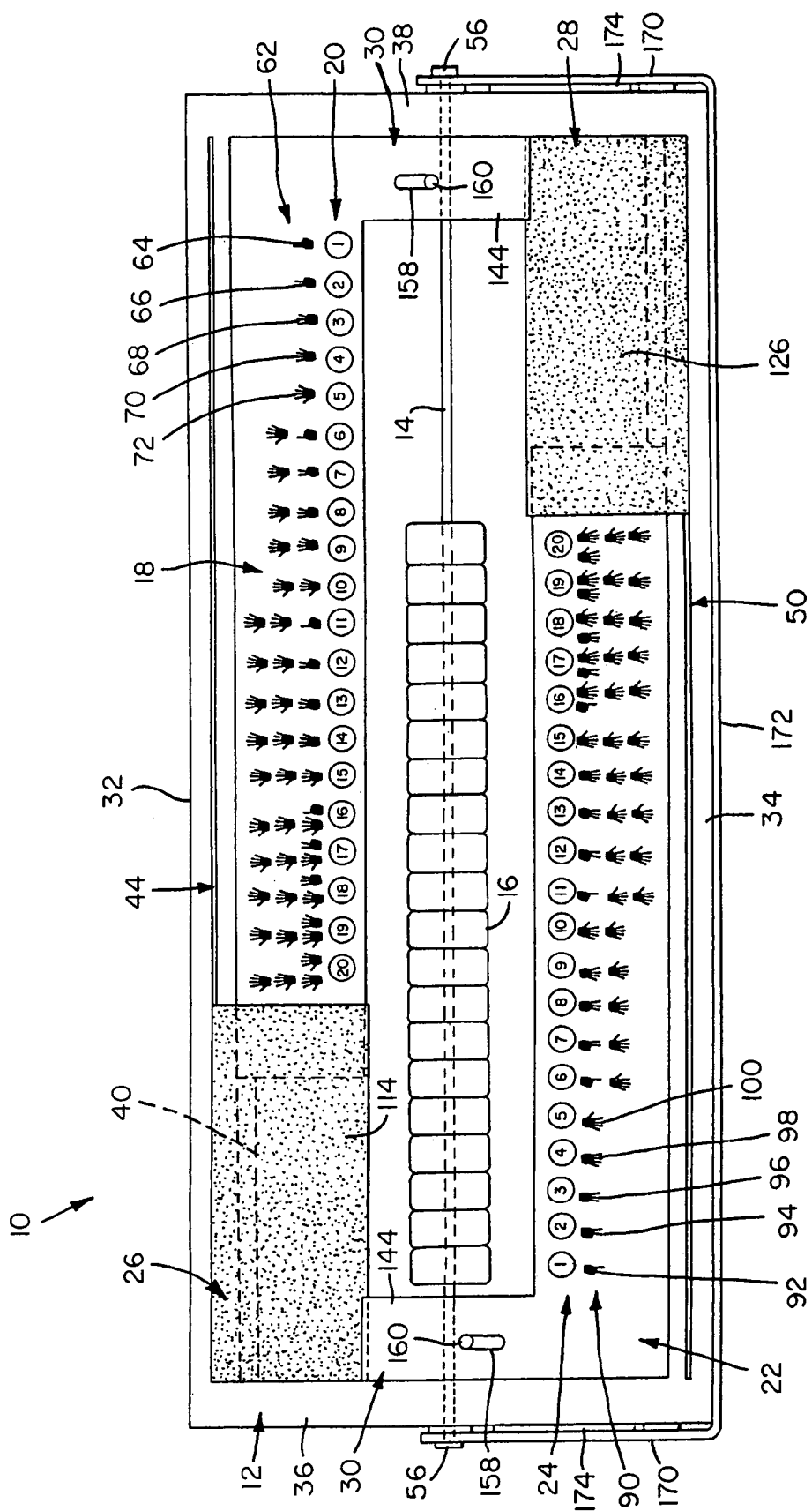
FIG. 1 is a front view of an educational tool in accordance with the present invention.

Referring now to the FIGS., an educational tool in accordance with the present invention is shown at 10. Tool 10 includes a rectangular frame 12 having a rod 14 extending from one of its sides to the other. A number of beads 16 are slidably positioned on rod 14. For counting beads 16, the top of frame 12 is provided with a movable reckoning bar 18 bearing indicia 20 in the form of a series of whole numbers starting with "1" and increasing from right to left. Also, the bottom of frame 12 is provided with a second laterally movable reckoning bar 22 bearing indicia 24 in the form of a series of whole numbers starting with "1" and increasing from left to right. A pair of opaque slides 26 and 28 is secured to the top and bottom of frame 12 for selectively hiding from view indicia 20 and 24 on reckoning bars 18 and 22. One of a pair of dividers 30 is respectively affixed to each of said reckoning bars 18 and 22 for separating beads 16 on rod 14 into smaller or larger groups.

Frame 12 includes a top member 32 and a bottom member 34 joined together by a pair of side members 36 and 38 in a rectangular shape. Extending along the bottom of member 32 is a rail 40 having a trapezoidal cross section, being relatively wide at its inner, free end. Also, extending along the top of member 34 is a rail 42 having a configuration like that of rail 40. Preferably, rails 40 and 42 are integrally formed with members 32 and 34 for simplicity in manufacturing but can be formed separately and suitably joined together later.

Top member 32 is provided with a pair of slots 44, one in its front and one in its back. Slots 44 extend substantially the entire length of member 32 from side member 36 to side member 38 parallel to rail 40. Each of slots 44 has a T-shaped cross-sectional configuration with a guide portion 46 of narrow width extending into top member 32 from its front or back side (so as to form the stem of the "T") and a wide, retaining portion 48 being centrally positioned at the inner end of guide portion 46 (so as to form the crossbar of the "T").

Bottom member 34 is provided with a pair of slots 50, one in each of its front and back sides. Slots 50 extend substantially the entire length of member 34 from side member 36 to side member 38 parallel to rail 42. Each of slots 50 has a T-shaped cross-sectional configuration with a guide portion 52 of narrow width extending into bottom member 34 from its front or back side and a wide, retaining portion 54 being centrally positioned at the inner end of guide portion 52.

Rod 14 extends through the midpoints of side members 36 and 38. Buttons or enlargements 56 are affixed to the opposite ends of rod 14 closely adjacent the outer sides of members 36 and 38. Buttons 56 prevent rod 14 from sliding laterally between members 36 and 38 and from becoming detached from frame 12.

Beads 16 are illustrated as being cylindrical in shape but may take any form capable of being grasped and manipulated by a user. For ease in conceptualizing and solving mathematical problems, however, beads 16 are of uniform size and width. Any number of beads 16, can be positioned upon rod 14 although the preferred tool 10 is provided with twenty.

Reckoning bar 18 is an elongated block 58 having a channel 60 in its top. Channel 60 has a trapezoidal cross-sectional configuration that corresponds with that of rail 40 so that bar 18 can slide freely along rail 40 from one side of member 32 to the other. As shown, bar 18 has a length that is somewhat greater than that of the cumulative widths of beads 16 so that all beads 16 can be positioned beneath bar 18.

The front of bar 18 is provided with indicia 20 in the form of a sequence of whole numbers. The number sequence is 1, 2, 3 . . . 20 increasing from right-to-left. The last number in the sequence corresponds with the total number of beads 16 positioned on rod 14. Similarly, the rear of bar 18 is provided with indicia 20 in the form of a whole number sequence that increases from 1 to 20 from right-to-left. The spacing between the numbers on the front and rear of bar 18 corresponds to the width of beads 16. A user may selectively bring either the front or rear of bar 18 into view by rotating frame 12 about a vertical axis.

Indicia 62 in the form of symbols representing a human hand with fingers outstretched are provided on the front of bar 18 adjacent each of the sequenced numbers comprising indicia 20. For example, adjacent the number "1" is a symbol 64 showing a hand with one finger raised. Adjacent the number "2" is a symbol 66 indicating a hand with two raised fingers. Next to the number "3" is a symbol 68 illustrating a hand with three raised fingers whereas adjacent the numbers "4" and "5" are symbols 70 and 72 respectively illustrating hands with four and five fingers raised. Beside each of the remaining numbers in the sequence of indicia 62 are combinations of the symbols 64-72 the sum of whose raised fingers equals the associated number. With reference to both indicia 20 and indicia 62, users of tool 10 can quickly gain pattern recognition skills.

On the back of bar 18 adjacent each of the sequenced numbers comprising indicia 20 are indicia 74 in the form of abstract symbols made up entirely of bars and dots. Here, adjacent the number "1" is a symbol 76 showing a single dot. Adjacent the number "2," however, is a symbol 78 made up of two dots positioned side-by-side. Next to the number "3" is a symbol 80 comprising three side-by-side dots and next to the number "4" is a symbol 82 including four dots positioned side-by-side. Adjacent the number "5" is a symbol 84, representing the number "5" featuring a horizontal bar. Beside each of the remaining numbers in the sequence of indicia 74 are combinations of the symbols 76-84 the sum of values indicated by dots and bars equals the associated number. With reference to indicia 74 and indicia 62, students can enhance their pattern recognition skills.

Reckoning bar 22 is an elongated block 86 having a channel 88 in its bottom. Channel 88 has a trapezoidal cross-sectional configuration that corresponds with that of rail 42 so that bar 22 can slide freely along rail 42. Bar 22 is the same length as bar 18.

The front of bar 22 is provided with indicia 24 in the form of a sequence of whole numbers from 1 to 20 increasing in size from left-to-right. The spacing between the numbers corresponds to the width of beads 16. Similarly, the rear of bar 22 is provided with indicia 24 in the form of a whole number sequence that increases from 1 to 20 from left-to-right. A user may selectively bring either the front or rear of bar 22 into view by rotating frame 12 about a vertical axis.

Indicia 90, in the form of symbols representing a human hand with fingers outstretched, are provided on the front of bar 22. Adjacent the number "1" is a symbol 92 showing a hand with one finger raised. Adjacent the number "2" is a symbol 94 indicating a hand with two raised fingers. Next to the number "3" is a symbol 96 illustrating a hand with three raised fingers and adjacent the numbers "4" and "5" are symbols 98 and 100 respectively illustrating hands with four and five fingers raised. Beside each of the remaining numbers in the sequence of indicia 90 are combinations of the symbols 92-100, the sum of whose raised fingers equals the associated number forming part of indicia 90.

On the back of bar 22 adjacent each of the sequenced numbers comprising indicia 24 are indicia 102. Adjacent the number "1" is a symbol 104 showing a single dot. Adjacent the number "2," however, is a symbol 106 made up of two dots. Next to the number "3" is a symbol 108 comprising three side-by-side dots and next to the number "4" is a symbol 110 including four dots positioned side-by-side. Adjacent the number "5" is a symbol 112, representing the number "5" featuring a horizontal bar. Beside each of the remaining numbers in the sequence of indicia 102 are combinations of the symbols 104-112 the sum of values indicated by dots and bars equals the associated, sequenced number of indicia 24.

Slide 26 includes a front plate 114 and a back plate 116 connected by a crosspiece 118 in a U-shaped configuration. At the free end of each of plates 114 and 116 is secured a tab 120 of T-shaped cross section that is adapted to slide within one of slots 44 in top member 32. Each tab 120 extends the length of plate 114 or 116 and has an inwardly directed fin 122 for positioning in the guide portion 46 of a slot 44 and a flange 124 secured to the free end of fin 122 for slidable positioning within the retaining portion 48 of a slot 124.

Slide 26 is dimensioned to cover a substantial portion of reckoning bar 18. To this end, plates 114 and 116 have a length that is about one-half that of reckoning bar 18. Also, plates 114 and 116 extend downwardly from slots 44 to the bottom of reckoning bar 18. Crosspiece 118 passes beneath reckoning bar 18 to join the bottoms of plates 114 and 116 together to fully encircle reckoning bar 18.

Slide 28 includes a front plate 126 and a back plate 128 connected by a crosspiece 130 in a U-shaped configuration. At the free end of each of plates 126 and 128 is a T-shaped tab 132 adapted to slide within one of slots 50 in bottom member 34. Each tab 132 extends the length of plate 126 or 128 and has an inwardly directed fin 134 for positioning in the guide portion 52 of a slot 50 and a flange 136 secured to the free end of fin 134 for slidable positioning within the retaining portion 54 of a slot 50.

Slide 28 is dimensioned to cover about one-half that of reckoning bar 22 and is about one-half as long as reckoning bar 22. Plates 126 and 128 extend upwardly from slots 50 to the top of reckoning bar 22. Crosspiece 130 passes over reckoning bar 22 to join the tops of plates 126 and 128 together to fully encircle reckoning bar 22.

Each of dividers 30 includes a box-like housing 138 within which a piston 140 is normally urged by a compressed spring 142 against rod 14. Housing 138 has a front wall 144, a back wall 146 and a pair of opposed side walls 148 that project past rod 14 from either reckoning bar 18 or 22 with which such are integrally formed. Remote from reckoning bars 18 and 22, a bottom wall 152 is connected at right angles to walls 144, 146 and 148.

Housing 138 is provided with a number of openings. As shown, side walls 148 are provided with axially aligned openings 156 sized to permit the passage of any of beads 16 through housing 138 on rod 14. Openings 156 also permit dividers to move along rod 30 in conjunction with reckoning bars 18 and 22 without binding upon rod 30. Elongated openings 158 in front wall 144 and back wall 146, however, permit the actuation lever 160, extending outwardly from piston 140, to move up and down.

Piston 140 is a generally rectangular block sized to reciprocate up and down within housing 138. The bottom of piston 140 has a groove 162 for seating against rod 14. A compressed spring 142, positioned between the top of piston 140 and either reckoning bar 18 or 22, normally urges piston 140 downwardly atop rod 14 such that beads 16 cannot pass through openings 156. By pressing an actuation lever 160 away from rod 14, however, piston 140 is moved from rod 14 so as to permit beads 16 to travel through housing 138.

Frame 12 has a stand 164 that permits tool 10 to be supported in an upright manner upon a horizontal supporting surface 166. Stand 164 comprises a U-shaped brace 168 having a pair of vertical legs 170 connected together by a horizontal foot 172. The tops of legs 170 are pivotally connected to the opposite ends of rod 14 and are secured to rod 14 by buttons 56. The bottoms of legs 170 and foot 172 can be extended below bottom member 34 of frame 12 when stand 164 is in a collapsed state.

Stand 164 also comprises a pair of slotted braces 174 that selectively retain foot 172 in a position extended from bottom member 34. Each brace 174 is an elongated plate that is connected at its bottom end by a pivot pin 176 to the bottom of a side member 36 or 38. Each brace 174 also has a slot 178 therein that extends along its length and has a plurality of spaced-apart branches 180 which can be employed to selectively catch a lug 182 projecting inwardly from each of legs 170. By catching lug 182 in a branch 180 close to pivot pin 176 tool 10 is caused to stand in an erect manner upon supporting surface 166. When, however, lug 182 is captured in a branch 180 that is remote from pivot pin 176, tool 10 is caused to recline somewhat upon supporting surface 166.

Figure 2:
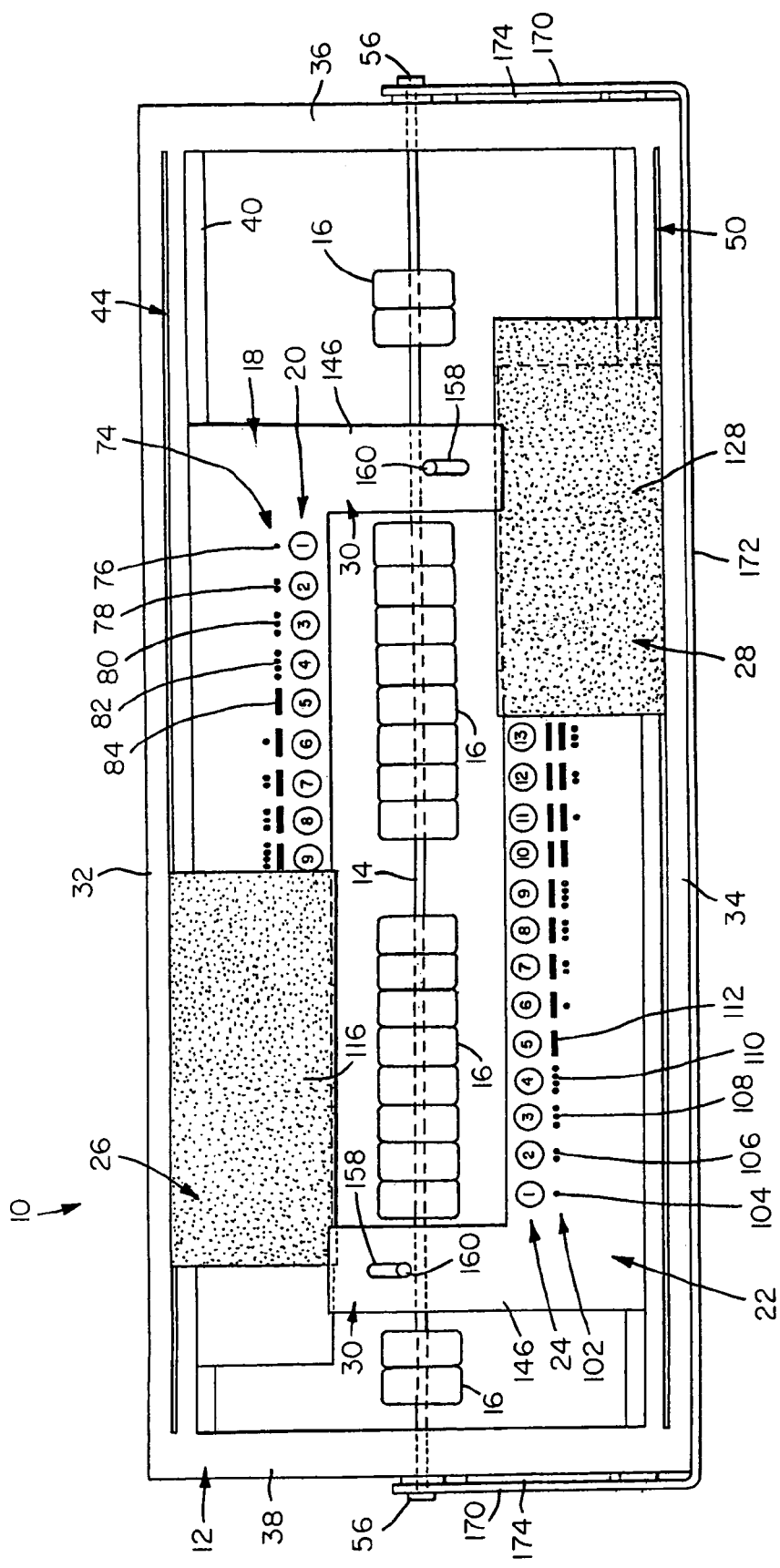
FIG. 2 is a rear view of the educational tool of FIG. 1.
Figure 3:
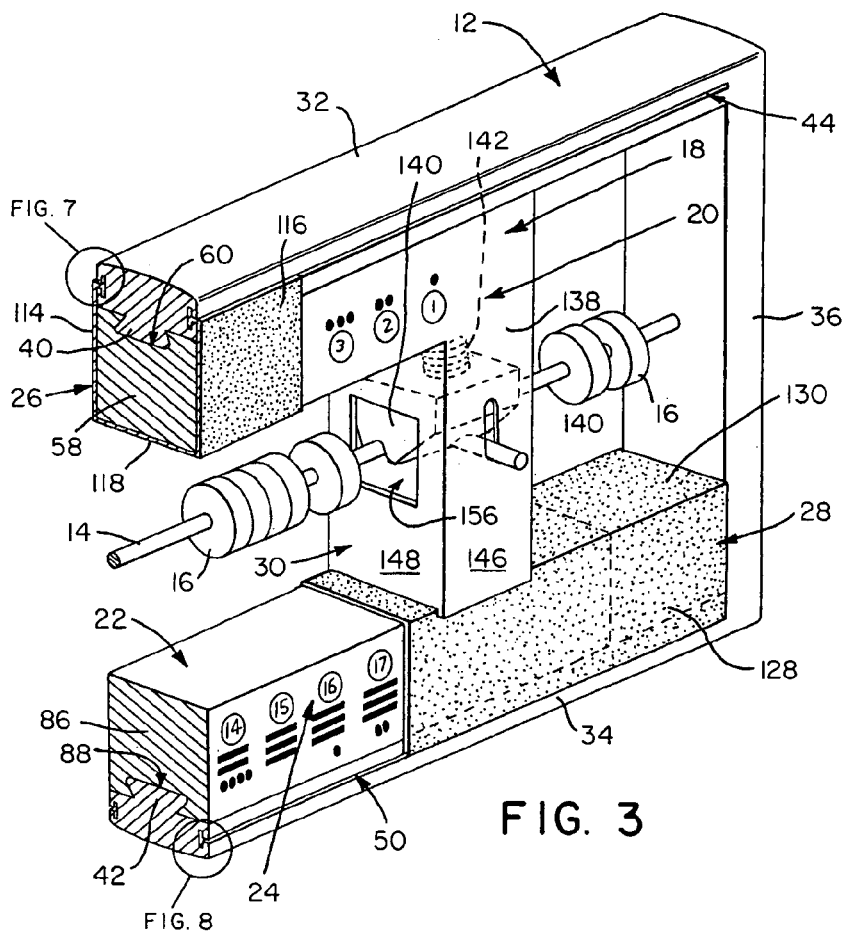
FIG. 3 is a perspective view of one side of the educational tool with portions broken away to reveal details thereof.
Figure 4:
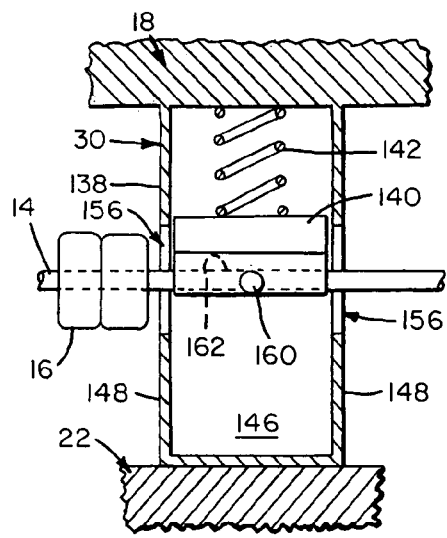
FIG. 4 is a cross-sectional view of a divider forming part of the educational tool with the piston of the divider being engaged with the bead-carrying rod.
Figure 5:
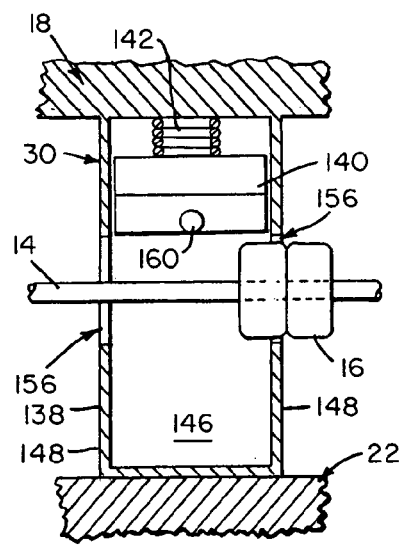
FIG. 5 is a cross-sectional view of a divider with the piston thereof being elevated and disengaged from the bead-carrying rod.

The use of educational tool 10 is straightforward. First, U-shaped brace 168 is pivoted outwardly from frame 12 and lugs 182 are inserted into one of slot branches 180 in each of braces 174. Then, tool 10 is positioned upon supporting surface 166 so that it faces both a student and his teacher. Next, the teacher may position a predetermined number of beads 16 between dividers 30 by moving pistons 140 away from rod 14 so that extra beads 16 can be moved through openings 156 to storage positions adjacent side members 36 and 38. At the same time, the teacher will position reckoning bars 18 and 22 as illustrated in FIG. 2 so that, when beads 16 are pressed against dividers 30, the two beads 16 immediately adjacent dividers 30 are vertically aligned with the numbers "1" forming part of indicia 20 and 24. (Each of the remainder of beads 16 will, because the spacing of the numbers forming indicia 20 and 24 is equal to the width of beads 16, line up with the remainder of numbers forming indicia 20 and 24.) Finally, the teacher positions slides 26 and 28 so that they cover the portions of reckoning bars 18 and 22 where solutions to a mathematics problem about to be posed will be located. This set-up process requires a few moments to complete, but tool 10 can now be used to solve a variety of problems.

Now, to solve a problem like 8+8=?, for example, the teacher will position eight beads 16 adjacent each of dividers 30 and ask the student to add the numbers of each of the two groups of beads 16 together. The student can, at this time, manually count the beads 16 in each group and propose a solution to the problem or the student can find the number of beads 16 in each group with reference to indicia 20 and 24 and propose a solution to the problem. To check the proposed solution, the two groups of eight beads 16 are pressed together against one of dividers 30 and, then, a slide 26 or 28, covering reckoning bar 18 or 22 against which the subject divider 30 is engaged, is moved to expose all of indicia 20 or 24 so that the number "16" can be read from indicia 20 or 24 adjacent the bead 16 farthest from the subject divider 30.

With educational tool 10 set up as described for solving addition problems, a student can be drilled on combinations. For example, with six beads 16 being positioned between dividers 30, a student can be shown, by dividing the beads into two groups and pressing each group against one of the opposed dividers 30, that six is the sum of: 6+0, 5+1, 4+2, and 3+3. The numbers themselves can be taken from indicia 20 and 24 on reckoning bars 18 and 22. Pattern recognition can be emphasized during these drills with reference to indicia 62, 74, 90 and 102. Reversing tool 10 to bring its back into view, of course, permits indicia 74 and 102 into view.

Subtraction is taught like addition. Here, a problem like 5−2=?, for example, would be illustrated by the teacher placing five beads 16 against one of dividers 30 with the bead 16 immediately adjacent divider 30 being in vertical alignment with the number "1" forming part of indicia 20 or 24. Simultaneously, slide 26 or 28 would be positioned to cover the portion of the reckoning bar 18 or 22, against which the subject slide 26 or 28 presses, where indicia 20 or 24 shows the number "3." Then, the teacher would instruct the student to move two beads 16 away from the group of five and count the remainder to propose a solution to the problem originally posed. Finally, the proposed solution would be checked by moving the slide 26 or 28 to reveal the number "3" adjacent the bead 16 positioned farthest from the subject divider 30.

During problem solving sessions, the number of beads 16 positioned between dividers 30 can be increased or decreased in a matter of seconds. Thus, a teacher can advance quickly to larger numbers with a bright student or maintain a slower pace with a student having difficulty with the mathematics concepts being taught. When a teaching session is at its conclusion, stand 164 is collapsed against frame 12 and tool 10 is stored in a convenient location, perhaps in a drawer. Tool 10 is always ready for immediate reuse.

While the invention has been described with a high degree of particularity, it will be appreciated by those skilled in the art that modifications may be made to it. Therefore, it is to be understood that the present invention is not limited to the sole embodiment of an educational tool described above, but encompasses any and all embodiments within the scope of the following claims.

I claim:

1. An educational tool, comprising:
   a frame having a first side and a second side;
   a rod extending between said first side and said second side of said frame;
   a plurality of beads being slidably positioned on said rod;
   a first reckoning bar being slidably secured to the top of said frame, said first reckoning bar bearing first indicia, for counting said beads, in the form of a series of whole numbers increasing in a direction from said first side to said second side of said frame;
   a second reckoning bar being slidably secured to the bottom of said frame, said second reckoning bar bearing second indicia, for counting said beads, in the form of a series of whole numbers increasing in a direction from said second side to said first side of said frame;
   a first slide being slidably secured to the top of said frame for selectively covering said first indicia on said first reckoning bar; and,
   a second slide being slidably secured to the bottom of said frame for selectively covering said second indicia on said second reckoning bar.

2. The educational tool according to claim 1 further comprising a stand pivotally secured to said frame by said rod for holding said educational tool upright upon a horizontal supporting surface.

3. The educational tool according to claim 1 further comprising a pair of dividers each being respectively secured to said first reckoning bar and said second reckoning bar for separating said beads into groups on said rod, and each of said dividers having a pair of openings through which said beads can be selectively slid and a spring-biased piston for selectively closing said openings.

4. An educational tool, comprising:
   a frame having a first side and a second side;
   a rod extending between said first side and said second side of said frame;
   a plurality of beads being slidably positioned on said rod;
   a first reckoning bar being slidably secured to the top of said frame, said first reckoning bar bearing first indicia, for counting said beads, in the form of a series of whole numbers increasing in a direction from said first side to said second side of said frame;
   a second reckoning bar being slidably secured to the bottom of said frame, said second reckoning bar bearing second indicia, for counting said beads, in the form of a series of whole numbers increasing in a direction from said second side to said first side of said frame;
   a first slide being slidably secured to the top of said frame for selectively covering said first indicia on said first reckoning bar;
   a second slide being slidably secured to the bottom of said frame for selectively covering said second indicia on said second reckoning bar; and,
   a pair of dividers being respectively secured to said first reckoning bar and said second reckoning bar for separating said beads into groups, and each of said dividers having at least one opening through which said beads can be selectively slid upon said rod and a spring-biased piston for selectively closing said opening.

5. The educational tool according to claim 4 further comprising an actuation lever extending outwardly from said spring-biased piston for manually driving said piston away from said rod to selectively open said opening.

6. An educational tool, comprising:
   a frame having a first side and a second side;
   a rod extending between said first side and said second side of said frame;
   a plurality of beads being slidably positioned on said rod;
   a reckoning bar being secured to said frame parallel to said rod, said reckoning bar bearing indicia for counting said beads;
   a slide being slidably secured to said frame for selectively covering said indicia on said reckoning bar; and,
   a divider being secured to said reckoning bar for separating said beads into groups, and said divider having at least one opening through which said beads can be selectively slid upon said rod and a spring-biased piston for selectively closing said opening.

* * * * *